United States Patent

[11] 3,575,665

[72] Inventor Takamichi Honma
Tokyo, Japan
[21] Appl. No. 736,516
[22] Filed June 12, 1968
[45] Patented Apr. 20, 1971
[73] Assignee Nippon Electric Company, Limited,
Tokyo-to, Japan
[32] Priority June 15, 1967
[33] Japan
[31] 42/38349

[54] ASYNCHRONOUS DEMODULATION SYSTEM FOR PULSE POSITION MODULATION SIGNAL UTILIZING PHASE OR FREQUENCY MODULATED HIGHER HARMONIC OF A SAMPLING FREQUENCY
2 Claims, 4 Drawing Figs.

[52] U.S. Cl. .......... 329/107, 307/232, 325/322, 328/109, 328/140
[51] Int. Cl. .......... H03k 9/04
[50] Field of Search .......... 329/104, 106, 107, 122; 325/321, 322, 326, 349; 328/140, 109, 110, 27, 23, 16; 307/232, 233

[56] References Cited
UNITED STATES PATENTS

| | | | |
|---|---|---|---|
| 3,014,183 | 12/1961 | Gilbert et al. | 329/107 |
| 3,028,487 | 4/1962 | Losee | 325/322 |
| 3,111,625 | 11/1963 | Crafts | 329/122X |
| 3,163,823 | 12/1964 | Kellis et al. | 307/233X |
| 3,183,448 | 5/1965 | Strother et al. | 329/107 |
| 3,210,667 | 10/1965 | Hern et al. | 325/321X |

*Primary Examiner*—Alfred L. Brody
*Attorney*—Hopgood & Calimafde

ABSTRACT: A system for demodulating pulse-position modulated (PPM) signals derives a phase or frequency-modulated wave from the incoming PPM signals through a band-pass filter having a center frequency substantially equal to an integral multiple of the sampling frequency of the incoming PPM signals. The phase- or frequency-modulated wave is then demodulated.

INVENTOR.
TAKAMICHI HONMA
BY
Hopgood & Calimafde
ATTORNEYS

ASYNCHRONOUS DEMODULATION SYSTEM FOR PULSE POSITION MODULATION SIGNAL UTILIZING PHASE OR FREQUENCY MODULATED HIGHER HARMONIC OF A SAMPLING FREQUENCY

This invention relates generally to pulse position modulation (PPM) demodulation techniques, and more particularly to a new and improved PPM demodulation system adapted for integration in a receiver operating in a PPM communication system and the provided with the capability of minimizing the deleterious effects caused by incoming false pulses that are usually intermingled in the received PPM signals.

Before proceeding to a detailed description of this invention, it would be necessary to make a comparison of the merits and demerits between the PPM and the delta modulation or PCM communication system (these systems will be simply referred to as PPM, DM, and PCM hereinafter).

Assuming that the transmitting information is voice signals whose maximum frequency is 3 kHz., the sampling rate for existing PPM systems is usually 8 kHz. The number of pulses transmitted per unit time in DM, for which a sampling rate of the order of 40 kHz. is required to secure comparable transmission quality, is of the order of 20 kHz. The corresponding values of PCM are also of the order of 20 kHz., because 5 bits per sampling point are a minimum requirement, though the sampling rate is the same as in PPM, or 8 kHz. It may be said therefore that PPM features the least order of sample rates of all existing pulse communication systems and the longest adjacent pulse spacings of the order of 125$\mu$sec in contrast to those for DM or PCM which are of the order of 25$\mu$sec.

For the previously mentioned and other features or merits, PPM methods have offered potent means in so-called RADA (random-access discrete-address) applications, in which simultaneous telephone communications can be established between mutiple pairs of stations by sharing three or four frequency channels, as will be analyzed. 1. Since the sampling rate is sufficiently small, mean emission power consumption is economized. 2. for occurrence of interference are less, because the number of pulses emitted per unit time from any interfering transmitter is small. 3. In wireless RADA applications in which a plurality of stations tend to be located in various ways depending on the geographical circumstances, a receiver communicating with the desired transmitter is subject to the so-called multipath distortion effect in the presence of nearby interfering transmitters. By this multipath distortion effect, pulse widths will be expanded equivalently at the receiver as many as several to 10 times the regular pulse width which is predetermined for any transmitters located nearer the receiver than the desired transmitter.

In such cases, the previously mentioned merit of possessing the longest pulse spacings by PPM signals offers an outstanding advantage in that, in spite of the expansion of pulse width, unoccupied time intervals are still retained between successive pulses transmitted from an interfering transmitter.

These merits of conventional PPM systems have been favorable qualifications for RADA applications, but, on the other hand, the defect commonly experienced with PPM that it is more sensitive to false pulses than DM or PCM with the facility of blanking (for the period beyond the modulation time period)—that is, the rate of lowering in the signal-to-noise (S/N) ratio is severer, seems to have been considered as if it had been an inherent defect of PPM techniques.

This defect has impeded the PPM from the full display of above-mentioned merits. This fact must have been discussed in many treatises and is not novel in itself, but, nevertheless, the present inventor feels that sufficient analysis and remedial measures for the defect have been overlooked.

It has been common practice in RADA communication systems to adopt the discrete address facility such as a TF (time-frequency) matrix to pick up desired pulses only. With an increase in the amount of traffic, interfering pulses from two or more undesired transmitters would create a similar TF pattern as would be obtained from the desired transmitter, whereby the discrete address facility would permit passage of some interfering pulses for the demodulation system as if they had been desired pulses. Such interfering pulses are commonly referred to as false address pulses. With an increase in the amount of traffic, or in the total number of pulses emitted per unit time, the probability for the admission of incoming false address pulses into each receiver rapidly increases.

PPM will now be compared with DM on a basis of the same order of traffic amounts.

Assuming that the TF matrix is used as the discrete address facility and the number of frequency channels is four, occurrence of false pulses in DM or PCM will amount to as high as 39 times (or equal to a fourth power of 2.5) that for PPM, because the the number of pulses emitted into space per unit time in DM or PCM is approximately 2.5 times that for PPM. This is to say that in order to maintain the same order of intelligibility and traffic amounts receivers operating in a PPM system must have the allowable rates for admission of false pulses which have been restricted to one thirty-ninth of those for DM or PCM receivers.

Assuming that the S/N ratio of 10 db. is the tolerable limit for transmission quality, it has been confirmed by both theory and experiment that the noise pulse amount, for which the S/N ratio reaches this value in DM whose sample rate is 40 kHz., is 6 kilo pulses per sec. The corresponding value for PPm, whose sample rate is 8 kHz., is theoretically 1.6 kilo pulses per sec, but the experimental value is a little less, being 1.2 kilo pulses per sec. Accordingly a comparison between DM or PCM without the blanking gate facility and PPM indicates that PPM systems are better adapted for increasing the traffic amount than DM or PCM.

One should recall here that the DM can incorporate a synchronous blanking gate facility for setting up gating time positions in coincidence with the sampling period by utilizing the known fact that the probability that DM pulses will occur in the DM modulator at the sampling time positions is one-half, thereby to blank for incoming false pulses arriving at times other than the sampling time positions. Stated specifically, it is possible with DM to reduce the amount of false pulses incoming the synchronous gate to one-fiftieth of the total number of false pulses incoming the input of the demodulator on the assumption that the gating time interval is sufficiently smaller than 1$\mu$sec, the sampling rate is 40 kHz., the sampling period is 25$\mu$sec, and the pulse duration is 1$\mu$sec. Thus the allowable rate for admission of false pulses in DM can be increased to 50 times 6 kilo pulses per sec, or 300 kilo pulses per sec. When this value is compared with 46.8 kilo pulses per sec (39 times 1.2 kilo pulses per sec) for conventional PPM demodulation systems, the advantages of DM (with synchronous blanking gate facility) over PPM for maintenance of comparable intelligibility and traffic amounts will be obvious.

As the following description proceeds, however, the superiority of the PPM demodulation systems improved by this invention to the DM will be fully appreciated.

An object of this invention is to open a promising vista for PPM applications by providing new and improved PPM demodulation schemes capable of permitting high rate of admission of false pulses without substantially sacrificing intelligibility. Theory predicts, as will be shown by computation afterwards, that the allowable false pulse limit for conventional PPM demodulators of the order of 1.2 kilo pulses per sec can be substantially doubled.

Another object of this invention is to provide such PPM demodulation schemes having the possibility of annexing a particular gate, or prediction blanking gate. It has been experimentally verified that by introducing this gate into the present demodulation system the tolerable rate for admission of false pulses can be multiplied as many as 30 to 50 times and the traffic amounts can be markedly increased accordingly.

Still another object of this invention is to provide such PPM demodulation schemes that can dispense with the bothersome means as used in conventional synchronous PPM demodulation systems of demodulating incoming PPM signals after phase-synchronized signals have been formed by an oscillator and sawtooth waves at the sampling frequency shaped. By this contrivance, the phase synchronization process has been eliminated and the pull-in time nullified.

The above-mentioned objects of this invention have been realized by providing means for extracting the $n$th harmonic (say, 15th harmonic) of the fundamental frequency, or the sampling frequency of say 8 kHz., from PPM signals in the form of a phase-modulated signal (or an equivalent frequency-modulated signal) and performing demodulation of the phase- or frequency-modulated signal.

According to conventional PPM demodulation systems, a ban has existed under which it has been considered to be technically improper to take the modulation time deviation more than one-half of the sampling period—that is, to provide so deep modulation as the adjacent sampling period frame is encroached upon and hence, demodulation becomes substantially impossible. This ban has been lifted by the advent of PPM demodulation systems according to this invention, which contemplates a rudimentary change in the current thinking of how PPM signals are to be treated.

Now, the principles of this invention will become more apparent from the following description taken in conjunction with the appended drawings in which.

Figure 1:
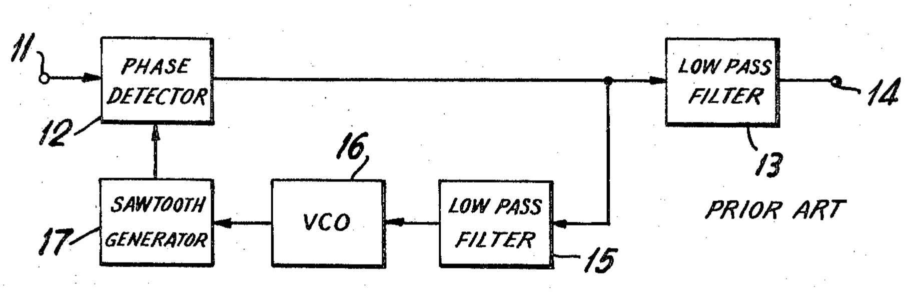
FIG. 1 is a block diagram of a typical prior art synchronous PPM demodulation system; that has been publicly known.

FIG. 1 is a block diagram of a typical conventional PPM synchronous demodulation system. It will be seen that a PPM signal applied to terminal 11 is delivered to phase detector 12 to which a sawtooth voltage at the sampling frequency has been applied from sawtooth-wave generator 17. The output of the phase detector 12 is delivered to output terminal 14 through a low-pass filter 13, while the output voltage of the phase detector 12 is applied to a low-pass filter 15, wherein the AC signal components, such as jittering and very low frequency noises, are discarded and the residual DC component only is applied to a voltage-controlled oscillator (VCO) 16 to control the oscillation frequency, which is set equal to the sampling frequency. The output voltage of the VCO 16 is applied to the sawtooth-wave generator 17. The frequency of the sawtooth waves is the same as the oscillation frequency of the VCO 16, and they are in a predetermined phase relationship with each other.

Figure 2:
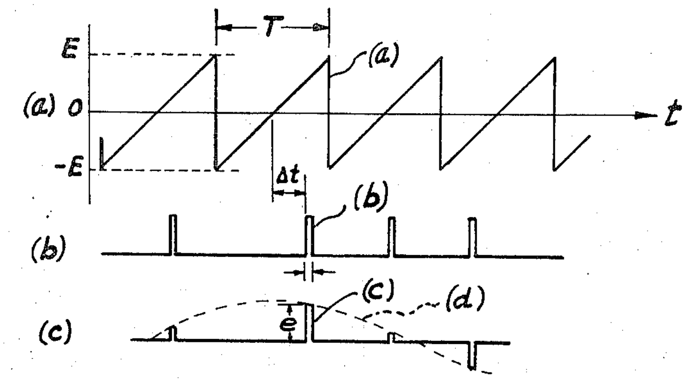
FIG. 2 is a waveform diagram illustrating operation of the PPM demodulation system shown in FIG. 1.

FIG. 2 is a waveform diagram illustrating operation of the phase detector 12. The sawtooth voltage applied to the phase detector 12 from the sawtooth-wave generator 17 varies linearly between two extreme values $\pm E$ passing through a voltage null at the repetition period $T$. On application of input pulses with duration $\tau$ to the phase detector 12 through input terminal 11, the sawtooth voltage appears at the output of the phase detector 12 within the pulse duration $\tau$ only. Thus the crest value $e$ of the output pulse $c$ may be expressed as $$e=E\times\frac{2\Delta t}{T} \qquad (1)$$

Accordingly the instantaneous pulse voltage $v$ with repetition period $T$, crest value $e$, and pulse duration $\tau$ is given by $$v=\frac{e\cdot\tau}{T}+\sum_{n=1}^{\infty}\frac{2e}{n\pi}\sin\left(\frac{n\cdot\pi\cdot\tau}{T}\right)\cos\left(\frac{2n\pi}{T}t\right) \qquad (2)$$

Since the components at frequencies higher than the upper limit of the modulating frequency are rejected by the low-pass filter 13 as the sampling theorem teaches, the second term (the sum term) in the right member of equation (2), composed of the sampling frequency component and its harmonic components are both sufficiently higher than the upper limit of the modulating frequency, becomes zero. Thus voltage $v_o$ which corresponds to the first DC component term in equation (2) will appear at terminal 14, which may be expressed, from equations (1) and (2), as $$v_0=\frac{2E\tau\Delta t}{T^2}$$

Assuming that the input signal is a PPM signal which is modulated by the pulse train of frequency $fm$ by the sine wave, and the maximum modulation time deviation is $\Delta T$, the demodulated signal voltage $v_o$ can be rewritten as $$v_0=EF\tau\times\frac{2\Delta T}{T}\sin 2\pi fmt \qquad (3)$$

where $$F=\frac{1}{T}$$

and $$\frac{2\Delta T}{T}$$

is the modulation degree whose maximum value is less than unity.

Substituting the relation $$\frac{2\Delta T}{T}=k$$

into equation (3) yields the demodulated signal power S expressed as $S=\frac{1}{2}E^2F^2\tau^2k^2$ Assume now with this conventional PPM demodulation system that the cutoff frequency of the low-pass filter 13 is $fa$ and false pulses of duration $\tau$ are interspersed at random in the desired signal at the rate of Q pulses per sec. Then noise power N in the demodulated output is given by $$N=\frac{2}{3}E^2Qfa\tau^2$$

Therefore the $S/N$ ratio of this system is given by $$S/N=\frac{3F^2k^2}{4Qfa} \qquad (4)$$

Consequently the output voltage components from the phase detector 12 from which the modulating frequency component and the sampling-frequency and its harmonic components have been all eliminated by the low-pass filter 13—that is, the DC and very low frequency components only (or the fluctuating component caused by relative frequency variation between the sampling frequency of the desired transmitter and the voltage-controlled oscillator), can participate in controlling the oscillation frequency of the voltage-controlled oscillator 16. According to the well-known technique, the voltage-controlled oscillator 16 works so as to minimize the DC and very low frequency components contained in the output voltage of the phase detector 12, with the result that the instant at which the linearly varying sawtooth voltage traverses a voltage null is maintained at the midpoint in the incoming PPM signal sampling period. Therefore, the oscillation frequency of the voltage controlled oscillator 16 is maintained equal to the sampling frequency $F$ of the desired transmitter and at a predetermined fixed phase relationship therewith.

The technical aspects of such a conventional synchronous PPM demodulation system that have been keenly recognized by the present inventor to be disadvantageous in view of full utilization of PPM techniques—that is, the key points that have become the background of this invention, were the following:

First, the demodulated signal voltage indicated by equation (3) uses only the DC component term, or the first term, in the right member of equation (2)—that is, the second term, which might be useful, is worthlessly discarded. Since energy of the DC component is $(e\tau/T)^2$, while that of each of the AC components is $2\,(e\tau/T)^2$, provided $$\frac{n\pi\tau}{T}<1,$$

it may be said that conventional synchronous PPM demodulation systems are considerably poor in the utilization of energy.

Second, the low-pass filter 15 permits passage of components only lower in frequency than the lower limit of the modulating frequency—that is, the pull-in range is considerably narrow. Thus, this demodulation system has inherent drawbacks such that a considerable pull-in time is needed for bringing the voltage-controlled oscillator 16 to a predetermined phase relation with the sampling frequency and further, that design requirements become appreciably rigorous. The natural oscillation 16 frequency of the voltage-controlled oscillator should in no case be in excess of the pull-in frequency range, otherwise the pull-in effect will be lost.

Third, the signal-to-noise ($S/N$) ratio becomes small in the presence of a certain amount of false pulses, provided, as will be evident from equation (4), the modulation degree $k$ be samll—that is, the maximum time deviation $\Delta T$ be smaller than one-half of the sampling period.

The present invention intends to eliminate all of these drawbacks of the conventional demodulation systems. A feature of this invention is a demodulation scheme by use of the $n$th harmonic at a frequency that is an integral multiple of the sampling frequency of PPM pulses.

Another feature of this invention is the dispensability of a sawtooth wave generator as conventionally used for phase synchronization with the sampling frequency, whereby a quick-response demodulation circuit can be realized without resorting to pull-in operation.

Still another feature of this invention is the utilization of the $n$th harmonic of the sampling frequency as mentioned previously. This enables PPM signals to be converted to phase-modulated signals. The phase modulation degree, which may be regarded as the phase deviation for PPM signals, increases with an increase in the ordinal numeral $n$. Accordingly, the present PPM demodulation systems will have the capabilites for holding considerably high values of $S/N$ ratio, as will be explained, even under adverse circumstances in which the maximum modulation degree of the PPM signals is quite small on the transmitter side and numerous false pulses are incoming the receiver.

These and other features will be more apparent from the following description.

Figure 3:
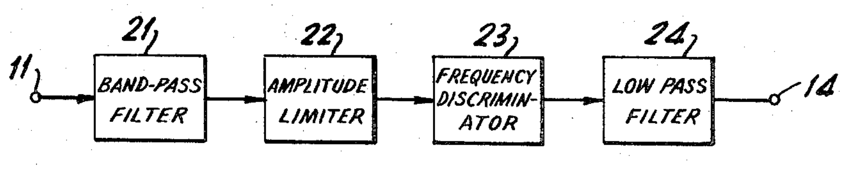
FIGS. 3 and 4 are respectively block diagrams of two PPM demodulation systems in accordance with two preferred embodiments of this invention.

Referring to FIG. 3 which illustrates in block diagram a preferred embodiment of this invention, it will be seen that a PPM signal applied to the input terminal 11 undergoes amplitude limitation by an amplitude limiter 22 after passage through a band-pass filter 21 and then, detection by a frequency discriminator 23. The output of the frequency discriminator 23 passes through a low-pass filter 24 to appear at the output terminal 14 as the demodulated output signal.

The instantaneous voltage $vp$ of the PPM signal with pulse width $\tau$, crest value $E$, sampling frequency $F$, *sinusoidal modulating frequency fm*, and maximum time deviation $\Delta T$ may be expressed as $$vp=E\tau\left(F+2\pi\frac{\Delta T}{T}fm\cos 2\pi fmt\right)+\sum_{n=1}^{\infty}\frac{2E}{n\pi}\sin\left\{n\pi\tau\left(F+2\pi\frac{\Delta T}{T}fm\cos 2\pi fmt\right)\right\}\times\cos\left(2\pi nFt+2\pi n\frac{\Delta T}{T}\sin 2\pi fmt\right) \qquad (5)$$

Suppose that the center frequency of the band-pass filter be $n$ times the sampling frequency, or $nF$. Then, as will be evident from equation (5), the frequency component having the frequency component having the frequency $nF$ is a phase-modulated wave at modulating frequency $fm$ whose maximum phase deviation is $2\pi n\ \Delta T/T$ radians. Therefore a continuous phase-modulated wave which is a continuous wave and whose carrier frequency is $nF$ appears at the output of the band-pass filter 21. Attention must be called here that the maximum phase deviation increases with an increase in the ordinal numeral $n$. This is to say $\Delta T$ may be small for a large number $n$. Assume that $\Delta T$ is small. As the sampling theorem teaches $F>2\,fm$, the amplitude term of the $n$th harmonic or $$\frac{2E}{n\pi}\sin\left\{n\pi\tau\left(F+2\pi\frac{\Delta T}{T}fm\cos 2\pi fmt\right)\right.$$

may be regarded, to good accuracy, as $$\frac{2E}{n\pi}\sin\,(n\pi F\tau)$$

neglecting the term for amplitude modulation. Thus, for small values of $\Delta T$, the signal power $C$ at the output of the band-pass filter may be expressed as $$C=2E^2\left\{\frac{\sin\,(n\pi F\tau)}{n\pi}\right\}^2$$

Let the passband of the band-pass filter be denoted by $B$ and suppose false pulses are admitted through the input terminal 11 at the rate of $Q$ pulses per sec. Then the interfering noise power $N$ at the output of the amplitude limiter 21 is given by $$N=\frac{2E^2QB}{F^2}\left\{\frac{\sin\,(n\pi F\tau)}{n\pi}\right\}^2$$

Therefore the carrier-to-noise ratio ($C/N$ ratio) at the output of the amplitude limiter 21 is $$C/N=\frac{F^2}{QB} \qquad (6)$$

This is apparently unrelated to the ordinal numeral $n$.

Assume that the low-pass filter 24 has a frequency response in which the modulation amplitude varies inversely proportional to frequency in the modulating frequency range—that is, the integral characteristics. That portion of the circuit in FIG. 3 which succeeds the band-pass filter is a publicly known phase modulated wave (PM) demodulator for the continuous PM wave, consisting of the amplitude limiter 22, the frequency discriminator 23, and the low-pass filter 24. Accordingly the $S/N$ ratio of this demodulation system as measured at the terminal 14 for a $C/N$ ratio of more than 8 (or more than 9 db.) as computed by equation (6) can be expressed, according to the publicly known $C/N$ to $S/N$ relationship, as $$S/N=\left(2n\pi\frac{\Delta T}{T}\right)^2\frac{F^2}{QB}=\frac{n^2\pi^2F^2k^2}{QB} \qquad (7)$$

When equation (7) is compared with equation (4) for the conventional synchronous demodulation system, assuming $k$ is constant, it can readily be noted that the improved PPM demodulation system will have the larger $S/N$ ratio under conditions of the equivalent false pulse admission rate, the higher the ordinal numeral $n$. Of course, $n$ cannot be taken excessively large, otherwise the modulation time deviation becomes invariably small, which, in turn, becomes the cause for increasing jittering noise due to the Gaussian noise occurring in the receiver power. This will degrade both the $S/N$ ratio and intelligibility. Actually there is a compromise between these two opposing requirements, which is a suitable integer between, say, 10 and 15.

Now a comparison will be made of the system of FIG. 3 and the conventional system shown in FIG. 1 assuming that the maximum frequency contained in voice intelligence is 3 kHz. The allowable false pulse rate for the $S/N$ ratio of 10 db. (the signal is assumed to be a sinusoidal wave) with the conventional system as computed by equation (4) is 1.6 kilo pulses per sec for $k=1$ (that is, $\Delta T=T/2$ and the sample rate is 8 kHz. In contrast, the maximum frequency deviation of the $n$th harmonic for $n=15$ $$\left(\text{assuming that } k=\frac{1}{15}\text{ for 800 Hz.}\right)$$

according to the improved technique of this invention becomes $\pi \cdot n \cdot k \times 800$ Hz.=2.5 kHz., because the voice energy distribution curve generally falls off inversely proportional to the square of frequency with increasing frequency higher than 300 Hz. Since 2.5 kHz. is less than the maximum modulating frequency 3 kHz., 6 kHz. (or ±3 kHz. offcenter frequency) it is a sufficient value for the passband B of the band-pass filter 21. Therefore the allowable false pulse rate for the *C/N* ratio of 9 db., or the threshold level, should be 1.33 kilo pulses per sec as can be computed by equation (6). The corresponding *S/N* ratio of the demodulated output becomes 19 db. as computed by equation (7).

Experience with PM or FM demodulation systems indicates that the *S/N* ratio decreases 2.5 db. for every decrease in the *C/N* ratio of 1 db. Because the *C/N* ratio for the allowable false pulse rate of 1.6 kilo pulses per sec is 8.2 db. as computed by equation (6), the corresponding *S/N* ratio of the demodulated output of the system shown in FIG. 3 becomes 17 db.

To conclude, the preferred embodiment of this invention shown in FIG. 3 is advantageous over the conventional synchronous PPM demodulation system in the following respects:

1 Notwithstanding that the modulation time deviation has been reduced to one-fifteenth the *S/N* ratio is improved by 7 db. for the same degree of admission of false pulses, or 1.6 kilo pulses per sec.

2. The allowable false pulse rate for the *S/N* ratio of 10 db. and the time deviation which is one-fifteenth of that for the conventional demodulation system is $$1.6 \times 10 \log \frac{17-10}{2.5} \text{ or } 3.05 \text{ kilo pulses per sec.}$$

This is almost twice as large the conventional rates of the order of 1.6 kilo pulses per sec.

3 Provides a possibility of reducing the number of random access false pulses in the ratio of 1:15, if a gating circuit permitting passage of false pulses during time periods in which PPM signals are applied be installed ahead of the input 11 to utilize the previously mentioned relationship that the modulation time deviation is only one-fifteenth of the sampling period.

Figure 4:
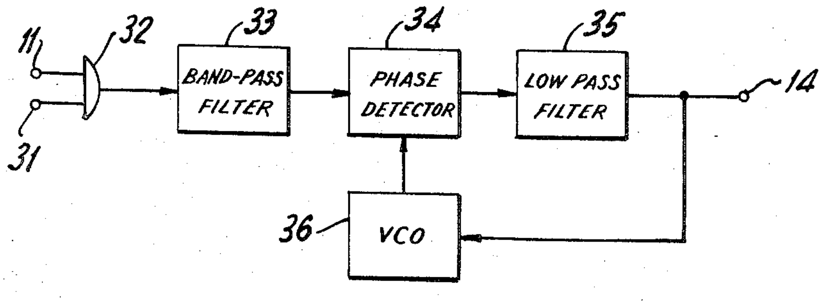

FIG. 4 is a block diagram of an improved (viz. the *C/N* ratio is lowered at the threshold level) version of FIG. 3 in that a larger number of false pulses can be admitted and that a PM demodulation circuit superior to the one shown in FIG. 3 is used. Inspection of this FIG. will readily reveal that a PPM signal applied to input terminal 11 passes a blanking gate 32 only during the time in which a control signal is applied to terminal 31 and that by passage through a band-pass filter 33, a phase-modulated wave whose carrier is the *n*th harmonic of the sampling frequency is applied, after being amplified to a suitable level, to a phase detector 34. It will also be seen that of the various components contained in the signal which has been detected by the phase detector 34, a low-pass filter 35 permits passage of only the DC and extremely low frequency components as well as the modulating frequency component, whereby a demodulated output appears at the terminal 14.

On the other hand, the output voltage of the low-pass filter 35 controls the oscillation frequency of a voltage-controlled oscillator 36, which is *n* times the sampling frequency, while the output of the voltage-controlled oscillator 36 is applied to the phase detector 34 so that a voltage proportional to the sine of the phase difference between the oscillation voltage and the phase-modulated signal voltage from the band-pass filter may be developed from the phase detector. Phase detector 34, low-pass filter 35, and voltage-controlled oscillator 36 constitute, in combination, a publicly known negative feedback-type phase detection system such as disclosed in U.S. Pat. No. 3,069,625 entitled "Reception System of High Sensitivity for Frequency- or Phase-Modulated Wave," as a potent means for the demodulation of phase-modulated waves.

This part of the system in FIG. 4, of course, may be replaced with a conventional demodulation circuit for phase-modulated signals as shown in FIG. 3, consisting of the amplitude limiter 22, the discriminator 23 and the low-pass filter 24, which had been publicly known before the patented invention came into existence. An advantage of adopting the negative feedback-type phase detection circuit of FIG. 4, however, is that the threshold level can be lower than would be obtained if the conventional PM or FM demodulation system were used as will be analyzed afterwards. The improvement in the threshold level with the system of FIG. 4 is equivalent to 4 in terms of the *C/N* ratio—that is, 6 db. for the bandwidth of the band-pass filter of 6 kHz. and the maximum modulating frequency of 3 kHz. The rate of admission of the allowable false pulses as computed by equation (6) becomes 2.67 kilo pulses per second and the corresponding *S/N* ratio as computed by equation (7) becomes 16 db.

With a conventional synchronous demodulation system, the *S/N* ratio for demodulation was 10 db. for the allowable false pulse rate of 1.6 kilo pulses per sec. In contrast, the corresponding *S/N* ratio as computed by equation (7) with the negative feedback-type phase detection system becomes 18.2 db., because the *C/N* ratio exceeds the threshold level of 6 db. Thus the *S/N* ratio for demodulation can be computed by equation (7) as 18.2 db., resulting in an improvement of the *S/N* ratio by 8.2 db. over the conventional PPM demodulation system. Further, the allowable false pulse rate for the *S/N ratio of* 10 db. (with the negative feedback-type phase detection system of FIG. 4) is computed as 4.63 kilo pulses per sec, which is as many as 2.9 times that for the conventional synchronous demodulation system.

The ordinary synchronous gating circuit 32 in FIG. 4, as has been mentioned, permits passage of input pulses (interspersed with false pulses) during gating periods corresponding to one-fifteenth of the sampling period, whereby the allowable false pulse rate is increased to 4.63×15 or 69.5 kilo pulses per sec. In a particular gating circuit the gate opening period can be made one twenty-fourth of the sampling period and the allowable rate can be increased to 111 kilo pulses per sec, (or 4.63×24) under the previously mentioned conditions and for the reasons as will be analyzed.

The time period $\tau g$ during which the blanking gate is open can be expressed as $$\tau g = \frac{2\Delta F}{F} T$$

where $\Delta F$ = maximum frequency deviation of the PPM signals, $\Delta F$ = sampling frequency.

The $\Delta F$ can be expressed as $$\Delta F = \frac{2.5 \text{ kHz.}}{15} = 0.1666 \text{ kHz.}$$

for $n$=15, assuming that the maximum demodulated frequency for the phase-modulated wave (*n*th harmonic) at the output of the band-pass filter in the receiver is 2.5 kHz. Therefore, $$\frac{\tau}{T} = \frac{2\Delta F}{F} = \frac{0.1666 \times 2}{8} = \frac{1}{24}$$

If a demodulator consisting of amplitude limiter 22 and frequency discriminator 23 in FIG. 3 is connected to the band-pass filter 33 in FIG. 4, the allowable rate will become 73.3 kilo pulses per sec (or 3.05×24). As compared with the conventional allowable rates of the order of 1.6 kilo pulses per sec, the improved false pulse admission rates are 69.3 and 45.8 times as large, respectively.

As has been mentioned, PPM is comparable with DM when the allowable false pulse rate of the former is one thirty-ninth of that for the latter to maintain the same amount of traffic for RADA applications using four radiofrequency channels. This is equal to one thirty-ninth of the allowable rate of 300 kilo pulses per sec obtained with DM using the synchronous gate, or 7.7 kilo pulses per sec. As compared with this value, the allowable rates of 111 and 73.3 kilo pulses per sec as obtained by the improved PPM demodulation scheme are respectively 14.4 and 9.5 times as large.

In DM, pulses forming a train may or may not occur in time slots equally spaced at the sampling period, as has been publicly known, while the same sampling period is used for all stations. Accordingly the synchronous gating means can be used and random false pulses up to as many as 300 kilo pulses per sec can be tolerated. This rate, however, becomes unsubstantial and can scarcely be permitted for RADA applications for the reasons as will be clarified. In RADA applications, in particular, the same sampling period is assigned for all stations and the probability that pulses will occur in each sampling time is as high as one-half. Therefore, pulses from two or more undesired transmitters should be received as false pulses as if they were from the desired transmitter; these undesired transmitters tend to generate false pluses successively. This situation is considerably different from what has been considered as random false pulse occurrence. In other words, once false pulses are interspersed in the desired pulses, speech may become unintelligible for some duration and the desired pulses cannot be received when they are synchronized erroneously with false pulses. The solution of this technical problem will be extremely difficult, if not impossible. In contrast, modulated PPM pulses are invariably distributed around the sampling time, and hence, irregularly spaced. Therefore false pulses will occur at random. This eliminates the possibility of occurrence of the above-mentioned difficulty anticipated in DM.

If a PPM modulation technique disclosed in the Pat. application Ser. No. 718,146 by the same inventor, and entitled A Pulse Position Modulation Communication System is applied, the pulse emission rate can be reduced to the order of from one-half to one-third, the amount of traffic can be substantially doubled or trebled, and false pulses made to occur at random, because pulses are not emitted when unmodulated and pulse spacings become invariably irregular. Therefore such a difficulty as anticipated in DM will be all the more perfectly eliminated.

A description has been made mainly of the improved PPM demodulation techniques in RADA applications, but it will be readily obvious by those skilled in the art that other applications would be possible, such as time-division multiplex PPM, for its outstanding merit of possessing larger allowable rates for admission of false pulses than the conventional PPM demodulation systems in spite of appreciably narrow modulation time deviations on the transmitting side.

The essence of this invention resides, as has been detailed, in utilizing a phase-modulated (or an equivalent frequency-modulated) wave which has been derived from incoming PPM signals through a band-pass filter whose center frequency is designed to be approximately equal to an integral multiple of the sampling frequency of the incoming PPM signals and in demodulating the phase- or frequency-modulated wave by a PM or FM demodulation circuit.

The band-pass filter as herein referred to may be of any suitable type such as lumped-constant, distributed-constant, crystal, or mechanical type, provided that suitable band-pass filtering action can be effected.

It will also be evident that any kind of PM or FM demodulation circuit will do, such as a combination of an amplitude limiter and a frequency discriminator (Foster-Seeley, double-tuning type, etc.) ratio detector circuit, gated beam tube-type detector circuit, or negative feedback-type phase detector circuit. The amplitude limiter in any of these circuits, if any, may be dispensed with, because input pulses in a train with which we are concerned will have the same amplitude and pulse width. In short, any kind of demodulation circuit is comprised within the scope of this invention, provided a PM or FM signal is received as an input, and a modulating frequency component can be derived as an output.

Now some essential merits of the PPm demodulation systems according to this invention will be recapitulated.

1. High energy utilization efficiencies which come from the fact that a higher harmonic of PPM signals is used.

2. Demodulation process for PM or FM signals with wide band gains, resulting in high *S/N* ratios even under conditions in which considerably numerous false pulses are present.

3. A blanking gate may be used. By this method, the number of false pulses arriving at the input of demodulator will be greatly reduced, because the modulation time deviation for transmitting signals can be reduced by this technique.

Among the incidental merits of the improved PPM demodulation techniques are the following:

4. This demodulation systems can find application in time-division multiplex PPM techniques.

5. The pulse width of PPM signals may be suitably chosen for optimum energy utilization by using a suitable pulse width expander such as a monostable multivibrator.

6. By suitably selecting the ordinal numeral *n* for the harmonics, a band-pass filter of high center frequency can be adopted for a low sampling frequency. This facilitates the design and manufacture of the filter as well as the demodulation circuit. While I have described above the principles of this invention in connection with preferred embodiments, it is to be clearly understood that this description is made only by way of example and not as a limitation to the scope of this invention.

I claim:

1. A pulse position modulation demodulation system for demodulating incoming pulse position modulation signals having a known sampling frequency, said system comprising a source of a pulse position modulated signal including a continuous modulated wave component, said modulating wave component having a carrier frequency which is a predetermined integral order harmonic frequency of the sampling frequency of the pulse position modulated signal, a band-pass filter coupled to said source for passing said modulated component and demodulator means coupled to the output of said band-pass filter for demodulating said modulated component that passes through said band-pass filter.

2. The demodulation system defined in claim 1, further comprising a blanking gate means provided ahead of said band-pass filter for passing said pulse position modulated signal, and means for controlling said blanking gate means so as to pass said pulse position modulated signal during only a predetermined time period.